United States Patent [19]

Kensrue

[11] Patent Number: 4,549,068
[45] Date of Patent: Oct. 22, 1985

[54] WELDING TORCH HAVING SWIVEL HEAD ASSEMBLY

[76] Inventor: Milo M. Kensrue, 49-320 Sunrose La., Palm Desert, Calif. 92260

[21] Appl. No.: 559,985

[22] Filed: Dec. 9, 1983

[51] Int. Cl.[4] .............................................. B23K 9/32
[52] U.S. Cl. ........................... 219/137.63; 219/137.31
[58] Field of Search ..................... 219/137.31, 137.63, 219/137.9

[56] References Cited

U.S. PATENT DOCUMENTS 3,689,733 9/1972 Matasovic ....................... 219/137.63
3,775,584 11/1973 Moerke ........................... 219/137.63

Primary Examiner—Roy N. Envall, Jr.
Assistant Examiner—Alfred S. Keve
Attorney, Agent, or Firm—Whann & McManigal

[57] ABSTRACT

A rotatable barrel mounting assembly comprising a main base barrel adapter structure of electrical conducting material that is detachably connectable with a connection block for cooling fluid, electrical, inert gas and welding wire sources of a MIG torch main housing that can be manually or robot manipulated. The barrel adapter structure is formed with a socket for rotatably receiving a curved barrel mounting end structure and establishing connections with the cooling fluid, inert gas and welding wire sources for use by a welding tip at the outer end of the barrel. Electrical connection with the barrel mounting end structure is accomplished by a collet nut of insulating material carried by the main base adapter structure, and which is rotatably operable to move flexible collet finger contacts on the main base adapter structure into engagement with a surface of the barrel mounting end structure and also hold the barrel in an adjusted rotated position. Other finger elements are also moved by the collet nut into and out of a position for holding the barrel mounting end structure against disconnection. A retainer ring normally permits movement of the collet nut to a position enabling rotatable adjustment of the curved barrel mounting end structure, but opposes movement of the collet nut to a position enabling its disconnection.

13 Claims, 5 Drawing Figures

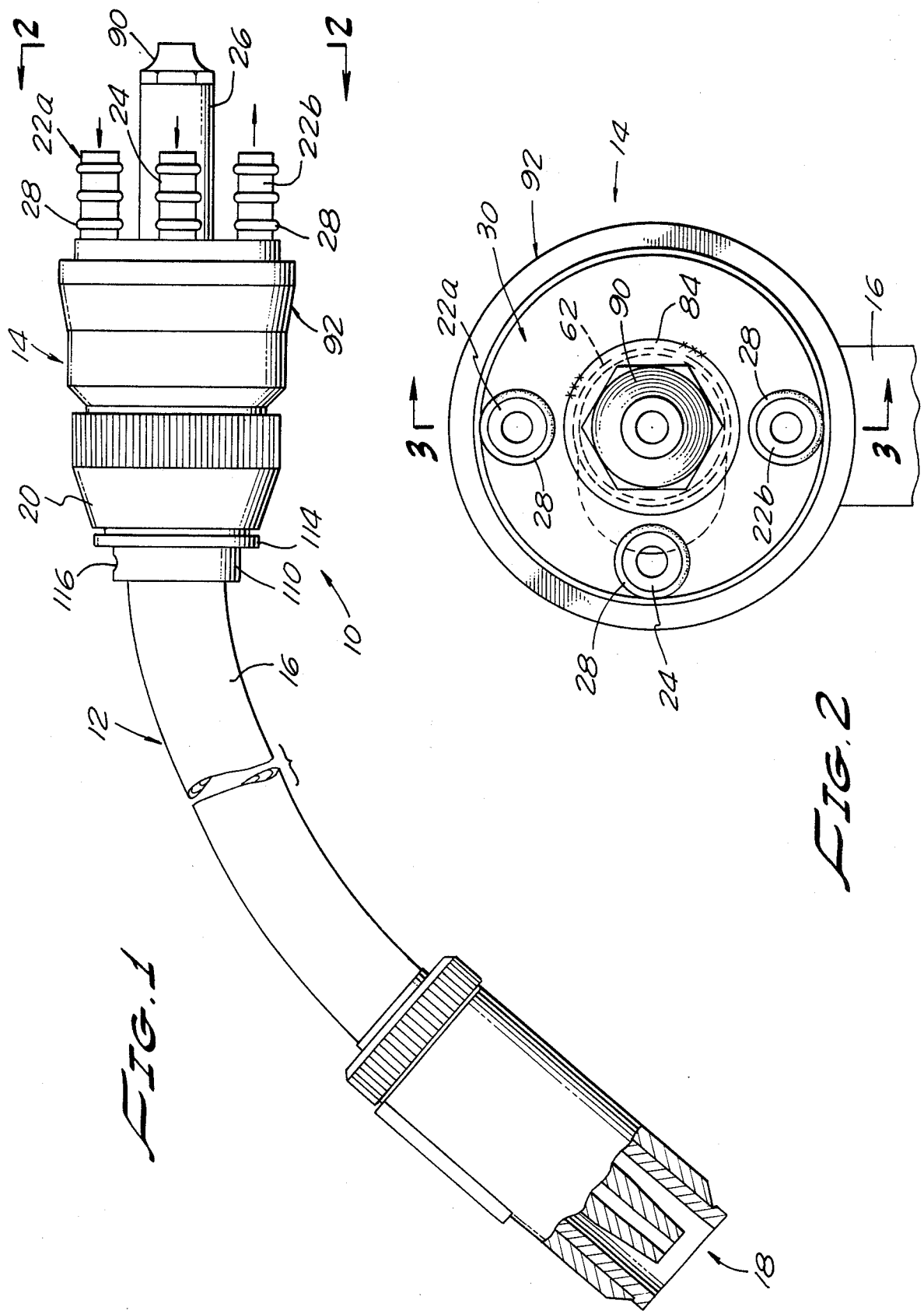

WELDING TORCH HAVING SWIVEL HEAD ASSEMBLY

BACKGROUND OF THE INVENTION

The present invention relates generally to a welding torch, and more particularly to a MIG welding torch of the type in which a curved barrel with a welding tip at its outer end is mounted for rotational movement into adjusted angular positions along a 360-degree path lying in a plane in right angled relationship to its axis of rotation.

With the recent trend in which MIG torches are used in robotic welding applications, a pressing need has developed for a welding torch with a curved barrel mounting a welding tip at its outer end, and in which the barrel is rotatably mounted and arranged for rotational adjustments to angularly disposed operating positions and of a design in which the overall barrel length would remain constant throughout the rotation, and wherein the angular position could be set precisely and locked in position in a manner such that the overall length of the barrel and its angular position would be precisely maintained.

There are available a variety of known welding torches which are provided with straight or curved barrels, and in some cases with air cooled barrels which may be rotated under limited operating conditions. However, to date applicant is not aware of any prior torch design which provides a satisfactory solution to all of the presented problems inherent in a high current, water cooled gas shielded torch.

One such known prior design comprises a torch arrangement as disclosed in Drawing No. 001-0745 of M. K. PRODUCTS, INC. of Irvine, Calif., in which a curved barrel structure is rotatably mounted in a main base barrel adapter structure and utilizes a precision taper to achieve mechanical locking and electrical contact between a main base adapter structure and a rotatable barrel structure. While this arrangement provided a capability not previously available, it had major problems in that the operator of necessity had to force and twist the barrel structure into a socket of the main base adapter structure to establish the electrical connection. This action precluded setting the rotation of the barrel structure to a precise angle, which was of minor consequence for manual welding but presented an extremely serious problem in robotic welding applications. Also, the exact length of the assembly was difficult to control, since very small changes in the taper resulted in a significant change in the overall length. The location of the taper on a relatively small diameter also resulted in a smaller cross section for welding current flow, and in some cases resulted in excessive heating, if not firmly seated.

The present invention is concerned with refinements and improvements in the structure disclosed in the above mentioned drawing and is specifically directed to the provision of a MIG welding torch having a curved barrel mounting a welding tip at its outer end and having connections for a coolant, shielding gas, welding current and welding wire, and which can be precisely angularly positioned, and wherein the overall barrel length remains constant throughout its rotation, and in which the angular rotative position may be set precisely and locked in the set position.

SUMMARY OF THE INVENTION

The present invention is specifically concerned with the provision of a unique and improved welding torch assembly in which the welding torch includes a curved barrel structure which is rotatably mounted for angular rotational adjustment and in which the overall barrel length remains constant throughout the rotation, and the angular position may be set precisely and locked in position by means of a collet clamping mechanism.

It is one object of the herein described invention to provide in a MIG welding torch an assembly having a curved barrel which can be manually angularly adjusted by a welder to reach previously inaccessible positions or to minimize fatigue, and which is susceptible of such precise and constant positioning throughout its rotation as to make it particularly suitable for robotic welding applications.

A further object is to provide in a welding torch having a coolant, shielding gas, welding current and welding wire connections, a torch barrel having a mounting end structure rotatably mounted in a socket of a main base barrel adapter structure to establish the coolant, gas and welding wire connections, and in which the electrical connection between the main base barrel adapter structure and the barrel mounting end structure are established by means of flexible collet contact fingers operatively associated with a rotatably mounted collet nut.

A still further object resides in the provision of a welding torch according to the foregoing object, in which the barrel is rotatably adjustable to different operating angles and the collet contact fingers further serve to secure the torch barrel in its adjusted angular position.

Another object of the present invention is to provide a welding torch with a barrel that is supported in a main base barrel adapter structure for 360 degrees of rotation, and wherein the torch barrel is held against detachment from the main base barrel adapter structure and also releasably secured in an adjusted angular position by means of flexible collet finger means operable into holding and non-holding positions by means of an associated collet nut, and in which manually releasable retainer means normally opposes movement of the collet nut to a position enabling detachment of the torch barrel from the main base barrel adapter structure.

Further objects of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only:

FIG. 1 is a side elevational view of a welding torch rotatable barrel assembly according to the present invention;

FIG. 2 is an enlarged fragmentary end view thereof, as seen from line 2—2 of FIG. 1;

DESCRIPTION OF A PREFERRED EMBODIMENT

Figure 3:
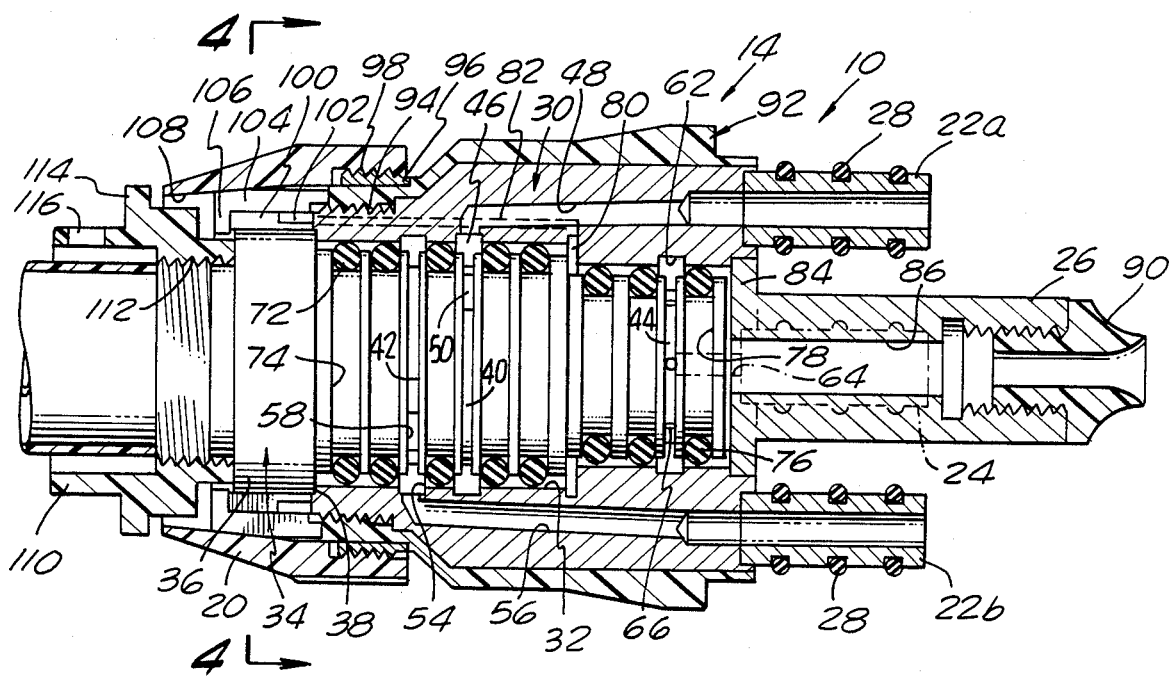
FIG. 3 an enlarged fragmentary longitudinal sectional view, partly in elevation, taken substantially on line 3—3 of FIG. 2, and showing details of the collet securing means.

For illustrative purposes, there is disclosed in FIG. 1 a rotatable barrel mounting assembly, as generally indicated by the numeral 10, that is arranged to be detachably connected with a connection block (not shown) provided on the main housing of a MIG welding torch or gun which can be manually manipulated or mounted as a unit on a robotic manipulator. Attachment of the barrel mounting assembly 10 to the connection block serves to operatably establish connections with cooling fluid, electrical, inert gas and welding wire sources provided in the torch main housing. The barrel mounting assembly 10 is of the plug-in type and in its broad concept embodies a barrel structure, as generally indicated at 12, which is rotatably supported and adjustable in a main base barrel adapter structure, as generally indicated at 14. The barrel structure includes a curved barrel member 16 which is connected at its outermost end with a conventionally known welding tip 18 as used in MIG welding operations. The innermost end of the barrel structure is rotatably supported within the main base barrel adapter 14 for 360 degree rotation, whereby the tip 18 may be adjustably moved in a plane in right angled relation to the axis of rotation of the inner end of the barrel. Provision is made for locking the barrel structure in the desired angle of rotation by means of collet means, which will be described later in detail, and includes a collet nut 20. The main base adapter structure 14 mounts plug-in tubular connectors 22a and 22b respectively for inlet and outlet cooling fluid, a tubular connector 24 for inert gas and a tubular connector 26 for welding wire. The connectors 22a, 22b and 24 are provided in each case with appropriate external sealing O-rings 28.

As best shown in FIG. 3, the main base barrel adapter structure 14 is fabricated to provide a cylindrical body 30 of a suitable electric conducting material, and which defines an open-ended socket 32 which is arranged to axially receive a barrel mounting end structure, as generally indicated at 34, into a seated position of rotation in which communication is established with the gas, cooling fluid, welding wire and electric current supply sources. The seated position of the barrel mounting end structure 34 in the socket 32 is determined by the engagement of a peripheral circumferentially projecting flange 36 with an internal socket shoulder 38 of the cylindrical body 30, the flange 36 being in electric conducting connection with the current supply to the barrel structure 12 and welding tip 18.

The barrel mounting end structure 34 is fabricated to provide an elongate cylindrical sleeve portion which includes circumferentially extending laterally spaced peripheral grooves 40, 42 and 44. The groove 40 is in communication with a socket wall groove 46 which is interconnected by flow passage 48 with the plug connector 22a for inlet cooling fluid. The bottom of the groove 40 is provided with an outlet opening 50 which communicates with barrel passageways 52, FIG. 4, leading to the welding tip 18.

The groove 42 peripherally is in communication with a socket wall groove 54 which is connected by a flow passage 56 with plug connector 22b for outlet cooling fluid. The bottom of the groove 42 is provided with an inlet opening 58 which is in communication with barrel passageways 60 leading from the welding tip 18.

Figure 4:
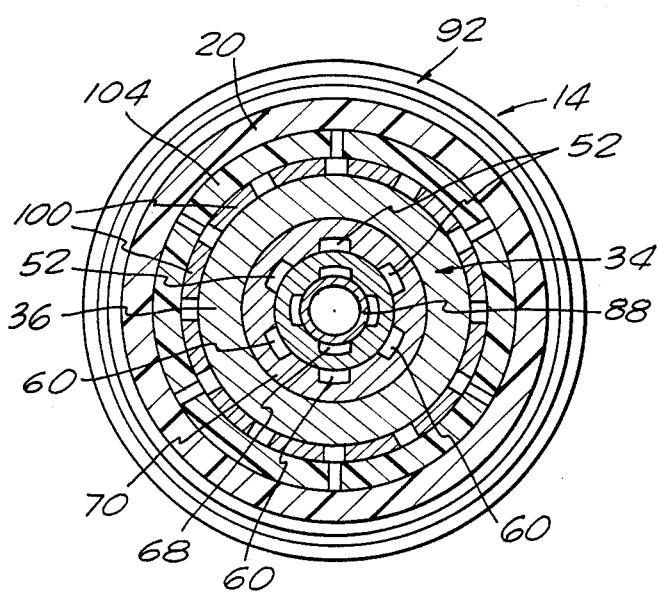
FIG. 4 is an enlarged transverse sectional view taken substantially on line 4—4 of FIG. 3, and showing the operative relationship of the collet nut and collet fingers.

The groove 44 peripherally is in communication with a circumferentially extending socket wall groove 62 which is connected by a flow passage 64 with the plug connector 24 for inert gas. The groove 44 is provided with a plurality of circumferentially spaced outlet flow openings 66 which are in communication with diametrically disposed barrel passageways 68 leading to the welding tip 18, these barrel passageways being separated by a surrounding barrel wall structure 70 from the cooling fluid conducting passageways 52 and 60, as shown in FIG. 4.

Appropriate circumferentially extending sealing O-rings 72 in retaining grooves 74 on the cylindrical sleeve portion are arranged to peripherally engage the inner wall of the socket and prevent leakage between and from the grooves 40 and 42. Preferably one O-ring is positioned between the grooves 40 and 42, while two rings are outwardly positioned from each of the grooves. Similarly, O-rings 76 are mounted in grooves 78 to prevent leakage from the groove 44. Preferably a single O-ring is outwardly positioned on one side of the groove 44 and two O-rings 76 are positioned on the opposite side of the groove 44. As thus arranged, two of the sealing rings 72 and two of the sealing rings 76 are interposed between the groove 44 for the inert gas and groove 40 for cooling fluid, and thus guard against the possibility of cooling fluid leakage contaminating the gas. Further measures are provided, however, to prevent such leakage contamination, and for this purpose, there is provided in the space between the adjacently disposed O-rings 72 and 76, a circumferential socket wall groove 80, this groove being connected to a vent passageway 82, whereby any leakage of coolant fluid will be vented to atmosphere and prevented from contaminating the gas which is being conducted to the welding tip 18.

The bottom wall of the socket 32 is formed by an annular inner end flange 84 on the plug connector 26 for the welding wire. This flange is secured to the end of the cylindrical body 30 as by brazing or other appropriate means. As thus mounted, the confronting ends of the flange 84 and the adjacent end of the barrel mounting structure 34 are in parallel relation, thus permitting rotation of the barrel structure in its seated position in a plane in right angled relation to its axis of rotation. The connector 26 has a longitudinally extending bore 86 which is axially aligned with a wire conducting tube 88 of the barrel structure, as shown in FIG. 4. The outermost end of the connector 26 threadedly mounts a wire guide 90 of insulating material.

Figure 5:
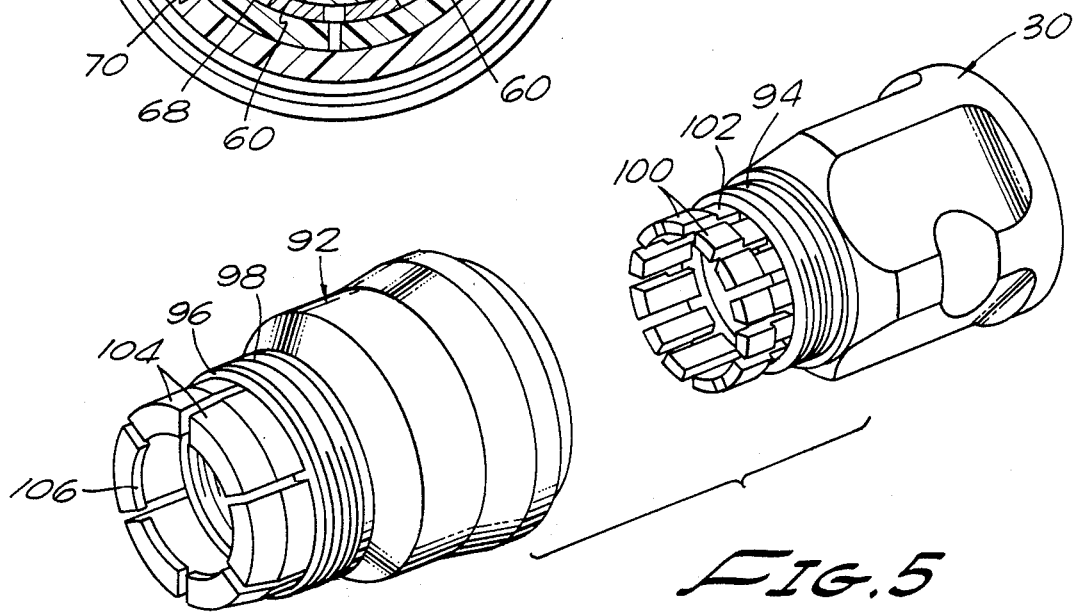
FIG. 5 is an exploded perspective view showing structural details of the main base barrel adapter structure and associated insulating sleeve and their cooperatively associated collet fingers.

As best shown in FIGS. 3 and 5, the main base barrel adapter structure 34 is comprised of a cylindrical body 30 of electric current conducting material and an outer sleeve 92 of an insulating material, which are conformed for mounting in nested relation, and have neck portions of reduced diameter which are releasably interconnectable by means of mating threads, as indicated at 94. Outwardly of the threads 94, the neck portion of the insulating sleeve 92 is provided with a metallic ring 96 which is bonded to the neck portion of the insulating sleeve and is formed with outer threads to provide a threaded connection as indicated at 98 with the adjacent end of the collet nut 20, whereby such nut may be rotated to cause axial operative movements thereof.

As shown in FIG. 5, the neck portion of the body 30 is fabricated to provide a plurality of circumferentially spaced metallic collet fingers 100 having reduced thickness shank portions 102 to provide increased finger flexibility. As shown in FIG. 3, the fingers 100 are arranged to extend over the outer surface of the flange 36 in the seated position of the barrel mounting end structure 34 in the socket 32.

In a similar manner, as shown in FIG. 5, the neck portion of the outer insulating sleeve 92 is provided with a plurality of circumferentially spaced collet finger elements 104 of insulating material. Preferably, there are a lesser number of fingers 104 than fingers 100, and in the assembled relation of the body 30 and the insulating sleeve 92, the fingers 104 are radially positioned outwardly of the fingers 100. As will be seen in FIG. 3, the outer end of each of the fingers 104 is formed with a radially inwardly extending end portion 106 which is movable by the collet nut 20 into a position in which it extends over the peripheral flange 36 in a manner to oppose axial disconnection of the barrel mounting end structure 34 from the socket 32. Radial inward and outward movements of the collet fingers 100 and 106 is selectively accomplished by axial adjusting movements of the collet nut 20 by virtue of an inner cylindrical tapered camming surface 108 having engaged relation with the outer collet fingers 104.

Further details of the operation of the above described collet concept as embodied in this application will now be described. Tightening rotation of the collet nut 20 will operate to move both collet fingers 100 and 104 radially inwardly into operative positions respectively with the flange 36 of the barrel mounting end structure 34. Thus, the collet fingers 100 will engage the outer surface of the flange 36 and establish electrical connections between the cylindrical body 30 and the welding tip 18, while at the same time operating to grippingly hold the barrel mounting end structure 34 in its rotational angle of adjustment. Simultaneously, the end portions 106 of collet fingers 104 extend radially inward over the adjacent peripheral edge of the flange 36 and oppose axial detaching movement of the barrel mounting end structure 34 from the socket 32. Upon a predetermined limited initial loosening rotation of the collet nut, only the collet fingers 100 will be released with respect to their holding position of engagement with the flange 36 so as to permit the angular rotational adjustment of the tip 18 to a desired operating angle. At this time, the end portions 106 of collet fingers 104 remain in their operative positions opposing detachment of the barrel structure. Upon a further rotational releasing movement of the collet nut 20, the collet fingers 104 will then move to a released position with respect to the flange 36 and permit detachment of the barrel structure.

Rotational loosening movement of the collet nut 20 beyond the initial predetermined limit is prevented by a retaining ring 110 which is connected with the barrel by mating threads as indicated at 112, and which permit axial tightening rotational movement of the ring into a normal stop limit position abutting the adjacent peripheral edge of the flange 36. The retaining ring 110 is provided with a peripheral flange 114 which, in the stop limit position of the ring, will be in spaced relation to the adjacent end of the collet nut 20 and thus limits its loosening rotational movement beyond the aforementioned initial predetermined limit position. Movement of the collet nut 20 beyond this initial limit position can only be effected when the retaining ring 110 is purposely rotatably loosened to an extent which will permit the nut 20 to be rotatably moved to a position beyond the predetermined initial limit and release the collet fingers 104 with respect to the peripheral edge of the flange 36. In order to prevent inadvertent movement of the retaining ring 110 to such position, the ring is preferably provided with an opening 116 for the engagement of a spanner wrench or other suitable tool.

From the foregoing description, it will be apparent that the welding torch structure as herein described accomplishes the stipulated objects and features as set out for the invention.

Various modifications may suggest themselves to those skilled in the art without departing from the spirit of my invention, and hence, I do not wish to be restricted to the specific forms shown or uses mentioned, except to the extent indicated in the appended claims.

I claim:

1. A welding torch structure, comprising:

a main base barrel adapter structure of electrical conducting material having a cylindrical open-ended receiving socket, and being provided with means respectively connectable with gas, water, welding wire and electric current supply sources;

an elongate torch barrel of electrical conducting material mounting a welding tip at one end and being provided at its other end with a mounting end structure adapted for endwise axial insertion into a seated position in said socket to establish operative connections with said gas, water and welding wire sources;

electric current conducting flexible contact means carried by said main base barrel adapter structure positioned to frictionally engage a surface portion of the seated barrel mounting end structure in a manner permitting relative movements between the main base adapter structure and the seated barrel mounting end structure; and manually operable means carried by said main base adapter structure for actuating the contact means into gripping engagement with said surface portion to hold said contact means and said surface portion against relative movement and to establish an operative electric connection with said electric current supply source.

2. A welding torch structure according to claim 1, in which:

said welding torch barrel is formed with a curved intermediate section, an outer end straight section coaxial with said welding tip, and an inner end straight section coaxial with said mounting end structure.

3. A welding torch structure according to claim 2, in which:

said main base adapter structure and said seated barrel mounting end structure are relatively freely rotatable about a common axis without angular restriction; and said welding tip is circumferentially relatively movable to angularly spaced operating positions lying in a fixed plane in right angled relation to said common axis.

4. A welding torch structure according to claim 3, in which:

the plane of movement of said welding tip is determined by confronting radial planar abutment surfaces of engagement respectively formed on said main base adapter structure and said seated barrel mounting end structure.

5. A welding torch structure according to claim 2, in which:

the operative gas and water connections between the main base adapter structure and the seated mounting end structure of the torch barrel include circumferentially extending adjacent laterally spaced flow channels respectively for water and gas;

a pair of laterally spaced apart sealing O-rings are positioned between said channels; and a vent passage connects the space between said O-rings to atmosphere.

6. A welding torch structure according to claim 5, in which:

said receiving socket has a smooth cylindrical side wall surface;

said flow channels and associated O-rings are carried by said mounting end structures; and said O-rings peripherally resiliently engage the surrounding socket side wall surface.

7. A welding torch structure according to claim 5, in which:

said vent passage is formed in the main base adapter structure.

8. A welding torch structure according to claim 2, in which:

said flexible contact means comprises a plurality of circumferentially spaced flexible collet fingers;

said seated barrel mounting end structure comprises a circumferentially extending peripheral flange having an outer cylindrical surface positioned for engagement by said flexible collet fingers; and said manually operable means includes a collet nut for actuating said collet fingers into gripping and holding relation with the cylindrical surface of said peripheral flange.

9. A welding torch structure according to claim 8, in which:

an insulating outer cylindrical sleeve member is threadedly secured in surrounding relation to said main base adapter structure;

said insulating sleeve has integrally formed flexible end finger members interposed between said collet fingers and said collet nut;

said collet nut is of insulating material and is threadedly engaged with said outer insulating sleeve member for axial movements in response to rotation; and an inner tapered surface formed on said nut is engageable with the finger members of said insulating sleeve member and is operative to effect radial movement of said sleeve fingers and said collet fingers towards and away from the cylindrical surface of the peripheral flange in response to the collet nut rotation.

10. A welding torch structure according to claim 9, in which:

said insulating sleeve fingers have inwardly directed end portions arranged in the gripping position of said collet fingers to extend over the peripheral flange of the barrel mounting end structure in a manner to oppose its axial disconnection from said main base adapter structure during a predetermined limited initial axial movement of said collet nut in a direction to release said collet fingers with respect to said peripheral flange, but upon further predetermined releasing movement of said collet nut being operative to release said insulation sleeve fingers with respect to said peripheral flange.

11. A welding torch structure according to claim 10, comprising:

manually operable means mounted on said barrel mounting end structure for normally restricting the movement of said collet nut to its limited initial axial movement, but being manually operable to a position enabling said further predetermined releasing movement of the collet nut to a position releasing said insulation sleeve fingers with respect to said peripheral flange.

12. A welding torch structure according to claim 11, in which:

the manually operable means for restricting the movement of said collet nut comprises a retaining ring threadedly mounted on said barrel mounting end structure; and said retaining ring has a peripheral projection extending into the path of axial movement of the collet nut, said projection being normally in spaced relation to the adjacent end of said collet nut.

13. A welding torch structure according to claim 12, wherein:

said peripheral projection comprises a circumferentially extending peripheral flange formed on said retaining ring.

* * * * *